US010359595B2

(12) United States Patent
Aramayo et al.

(10) Patent No.: US 10,359,595 B2
(45) Date of Patent: Jul. 23, 2019

(54) SLIDE AND TILT TRAY, SLIDE AND TRAY USING SAME

(71) Applicant: BELDEN CANADA INC., Saint-Laurent (CA)

(72) Inventors: Aldo Loayza Aramayo, Pointe-Claire (CA); Marc Fontaine, Les Cèdres (CA)

(73) Assignee: BELDEN CANADA INC., Saint-Laurent (CA)

( * ) Notice: Subject to any disclaimer, the term of this patent is extended or adjusted under 35 U.S.C. 154(b) by 0 days.

(21) Appl. No.: 16/143,621

(22) Filed: Sep. 27, 2018

(65) Prior Publication Data

US 2019/0107682 A1 Apr. 11, 2019

Related U.S. Application Data

(60) Provisional application No. 62/568,456, filed on Oct. 5, 2017.

(51) Int. Cl.
*G02B 6/44* (2006.01)
(52) U.S. Cl.
CPC .................. *G02B 6/4455* (2013.01)
(58) Field of Classification Search
CPC .................................................. G02B 6/4455
See application file for complete search history.

(56) References Cited

U.S. PATENT DOCUMENTS

| 2008/0085093 | A1* | 4/2008 | Krampotich | G02B 6/4455 385/135 |
| 2009/0274430 | A1* | 11/2009 | Krampotich | G02B 6/4455 385/135 |
| 2010/0296791 | A1* | 11/2010 | Makrides-Saravanos | G02B 6/4455 385/135 |
| 2010/0310225 | A1* | 12/2010 | Anderson | G02B 6/4455 385/135 |
| 2011/0109213 | A1* | 5/2011 | Wong | G02B 6/4455 312/334.7 |
| 2017/0082815 | A1* | 3/2017 | Takeuchi | G02B 6/4452 |
| 2018/0003912 | A1* | 1/2018 | Sedor | G02B 6/3897 |
| 2018/0259736 | A1* | 9/2018 | Hsu | G02B 6/4455 |

* cited by examiner

*Primary Examiner* — Sung H Pak
(74) *Attorney, Agent, or Firm* — Hugh Mansfield

(57) ABSTRACT

A fiberoptic cabinet is disclosed comprising a tray for receiving a plurality of cassettes and comprising pins positioned opposite one another on the side edges towards a rear edge which together defining a hinge axis, and sliders positioned opposite one another on the side walls. The sliders comprise a channel defining an opening and an extension member held slideably within the channel and comprising a slot aligned with the opening. The extension member is slideable within the channel between where the extension member is positioned towards a rear of the channel and where the extension member is positioned adjacent a front end of the channel. The pins are held within slots, and the tray is dimensioned such that when the extension member is slid to the rear, the side edges are received within the openings and when the extension member is slid to the front, the side edges are freed from the openings and the tray is pivotable about the axis.

14 Claims, 8 Drawing Sheets

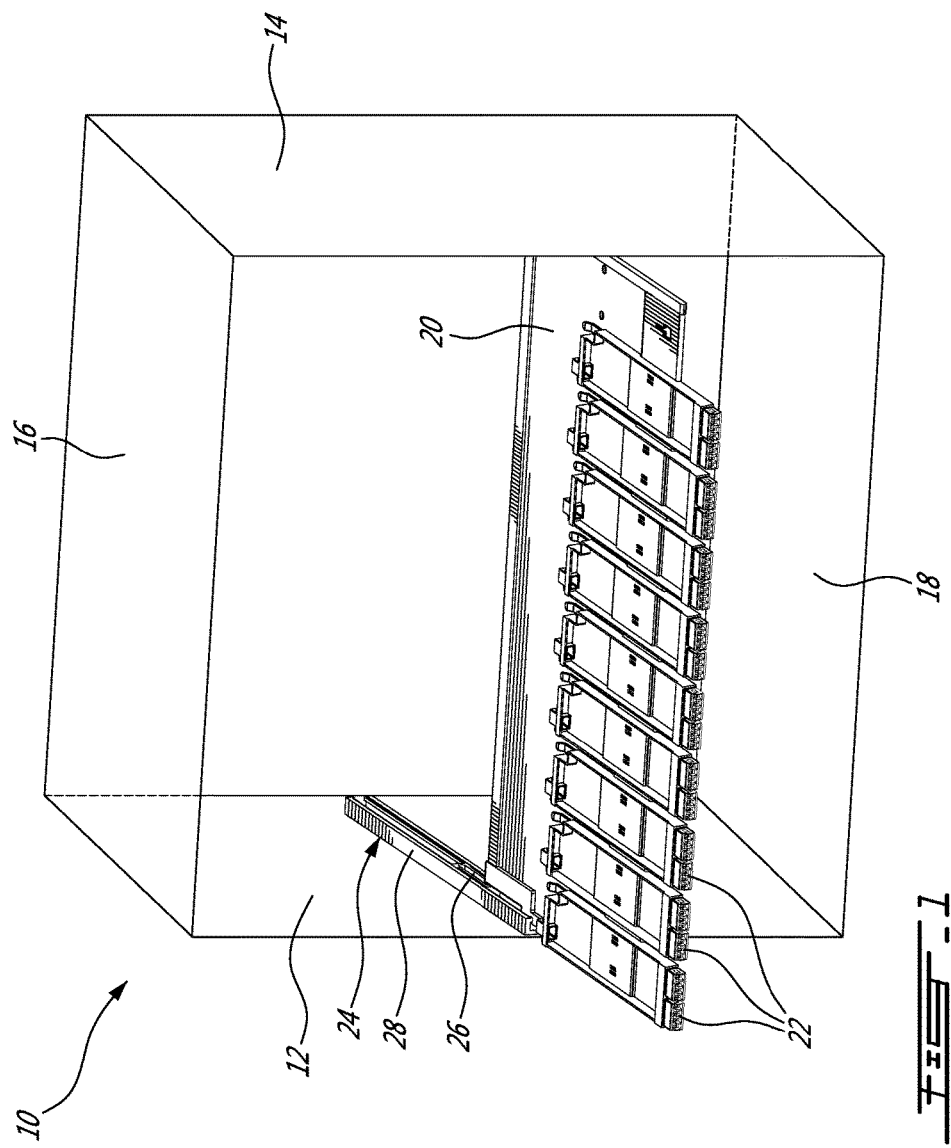

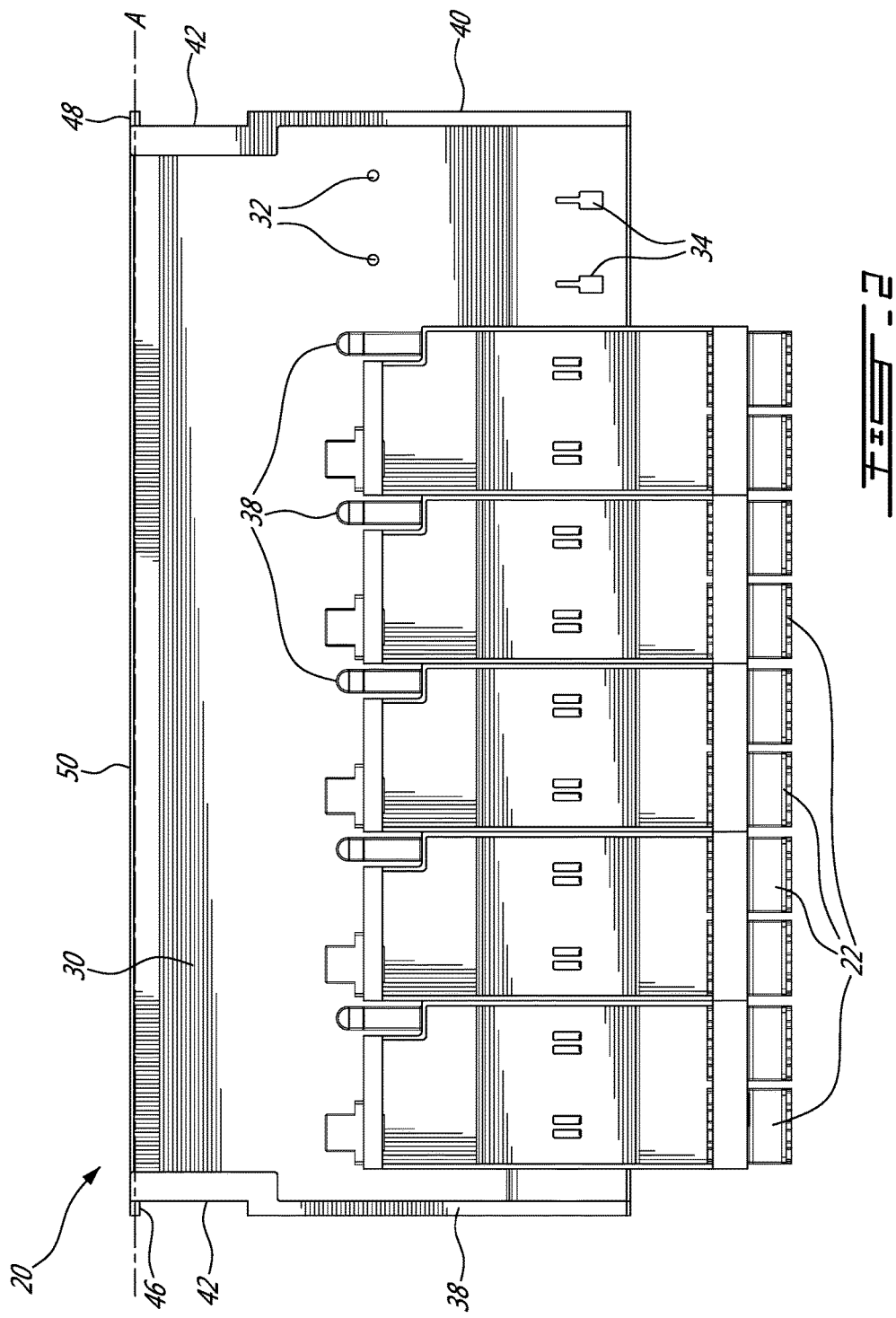

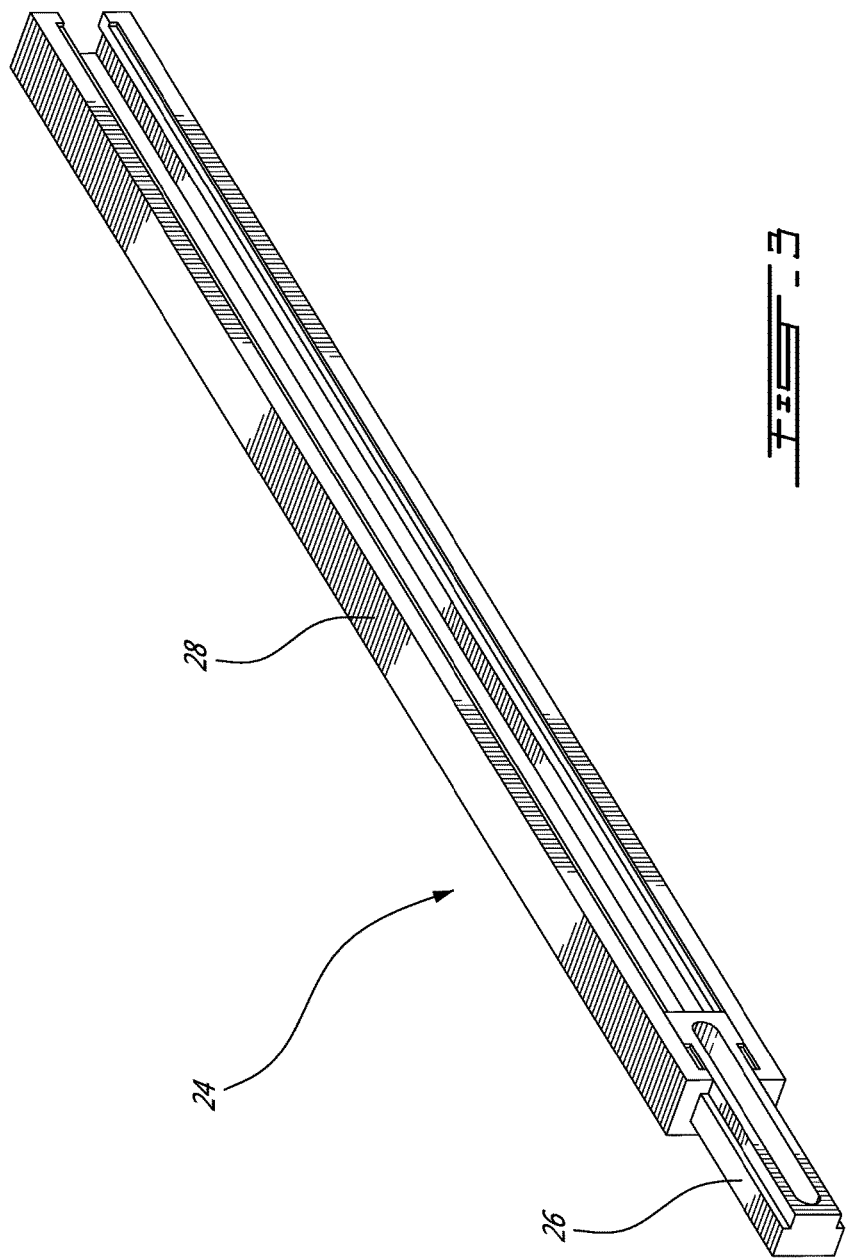

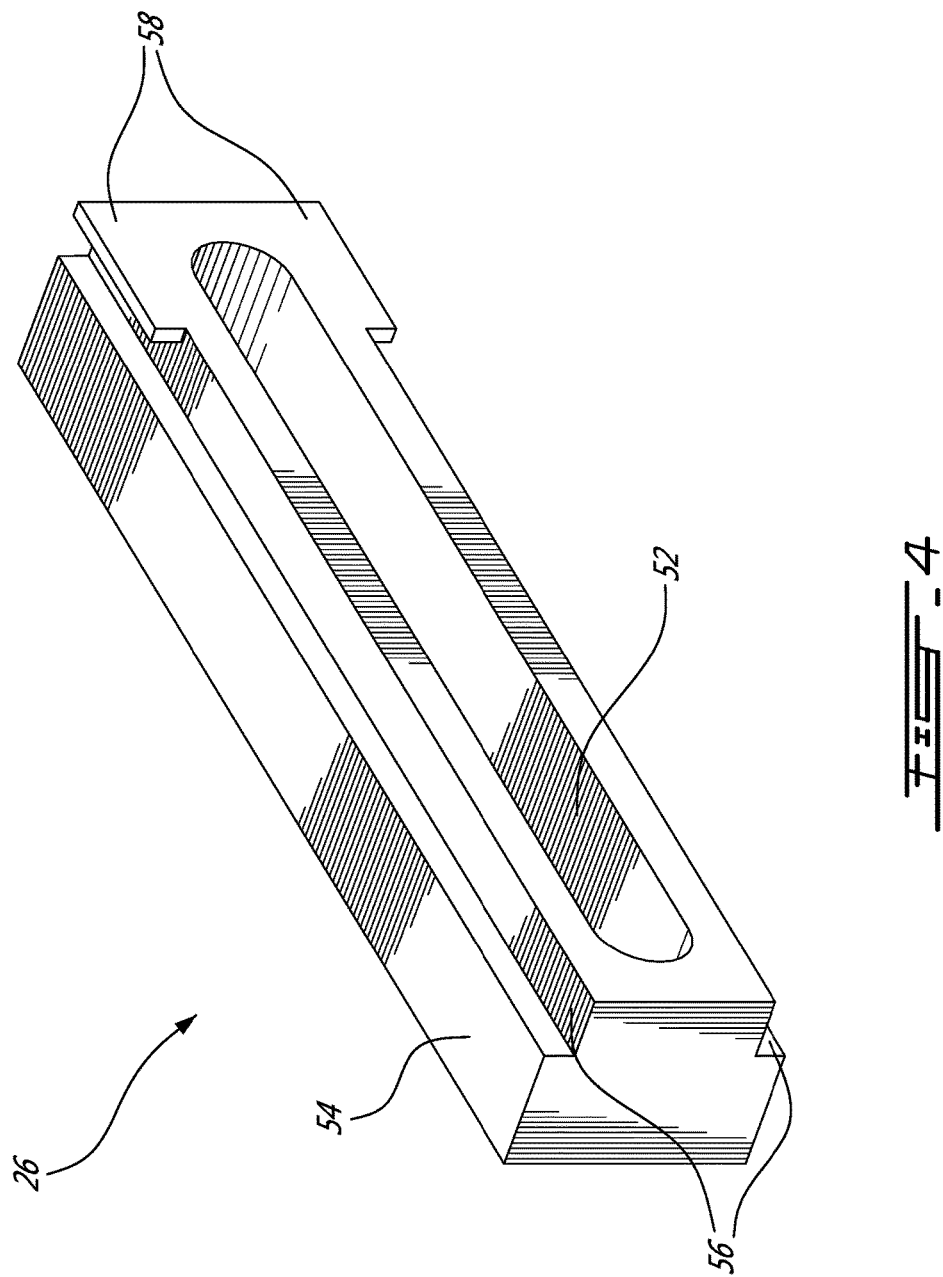

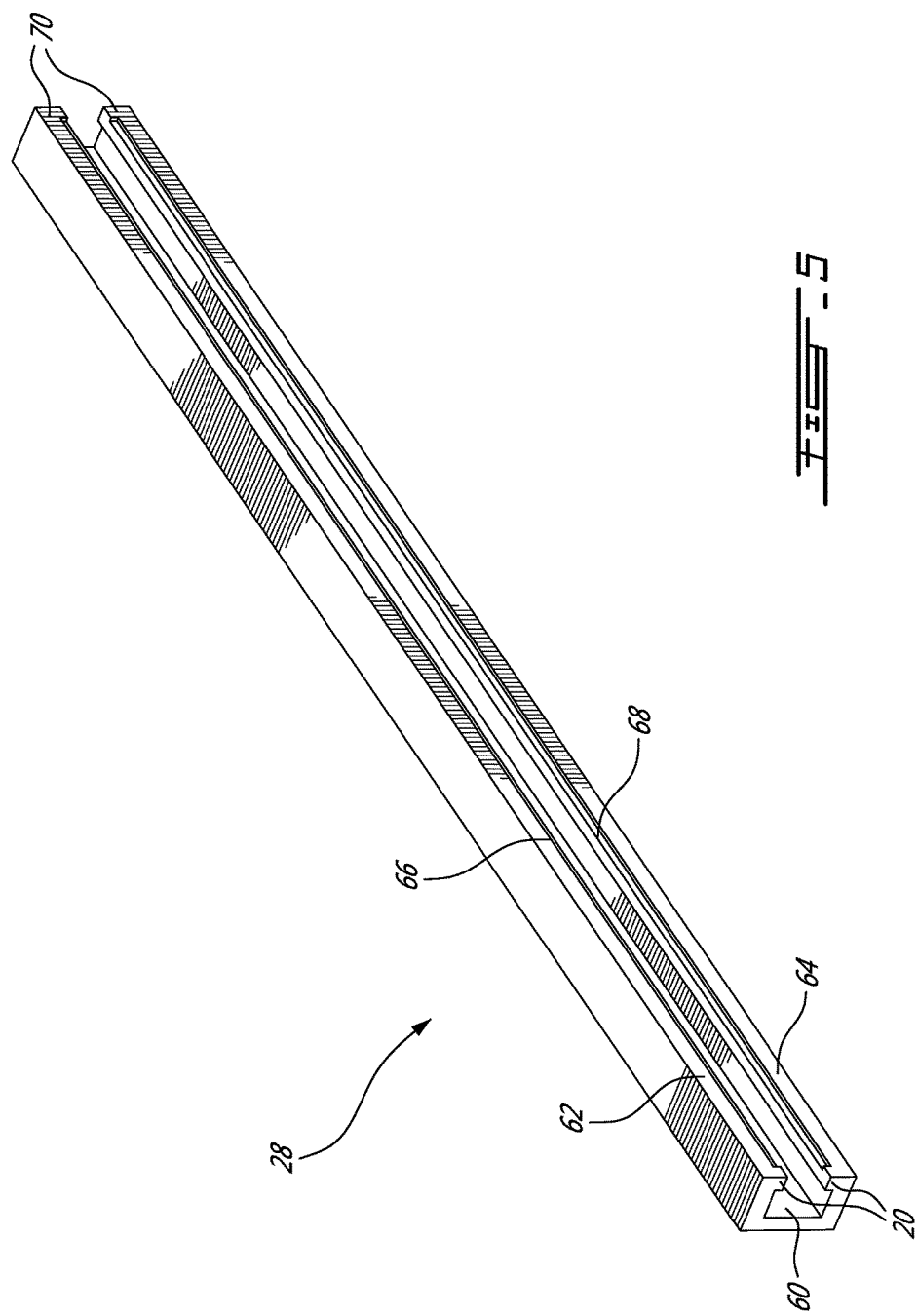

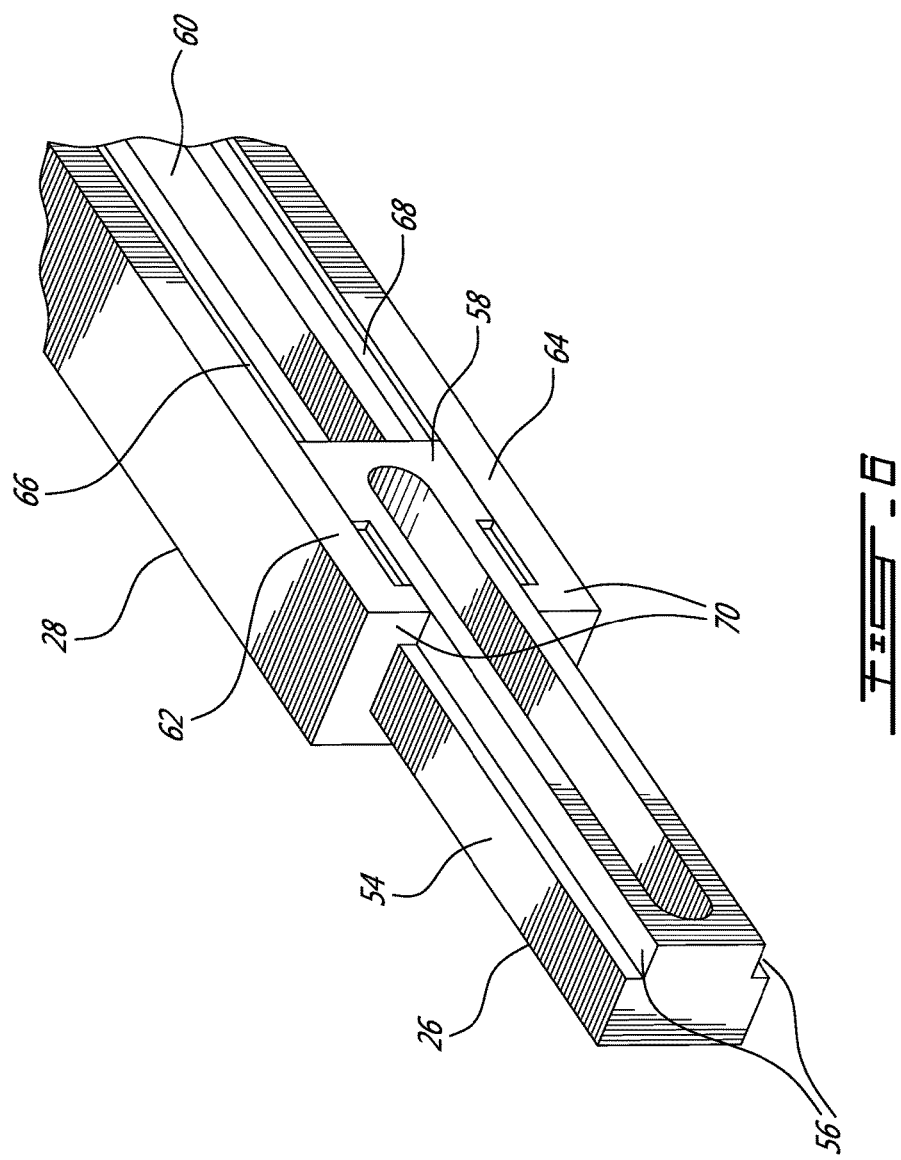

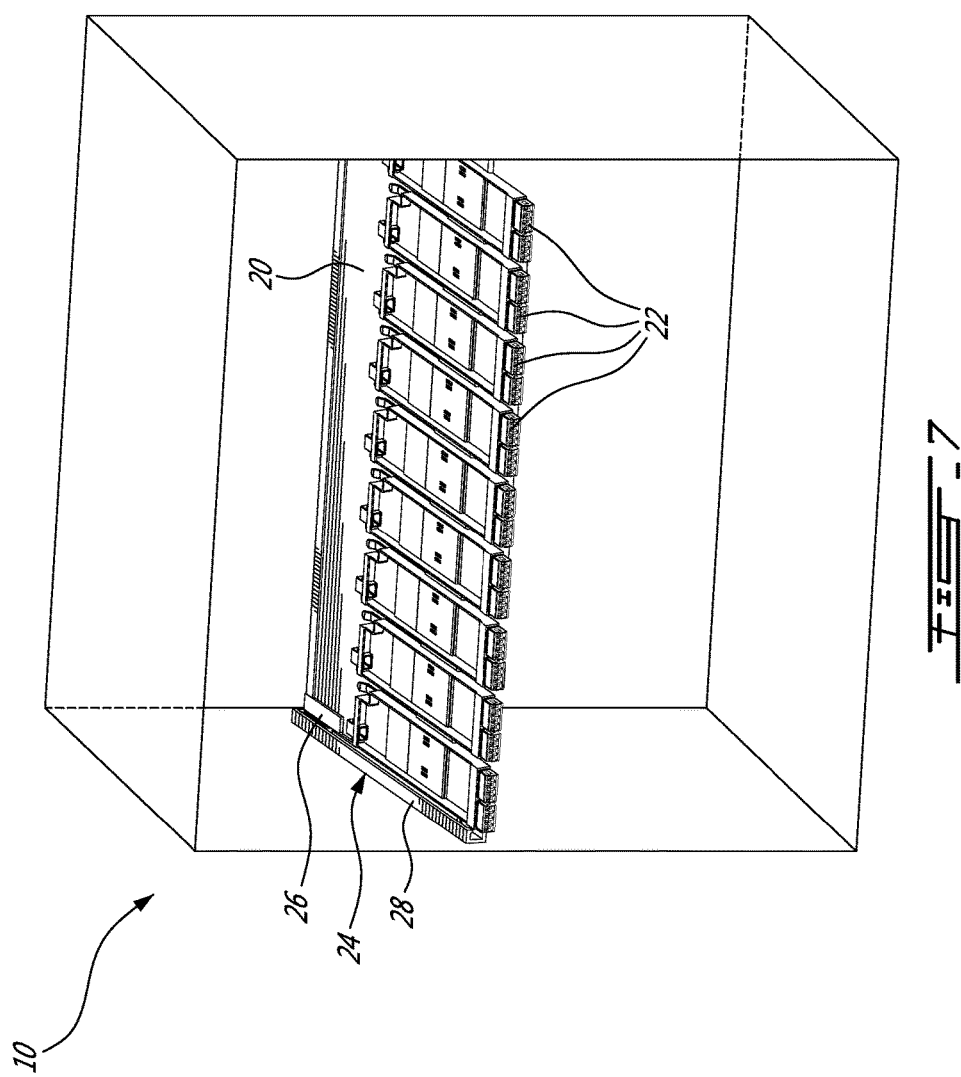

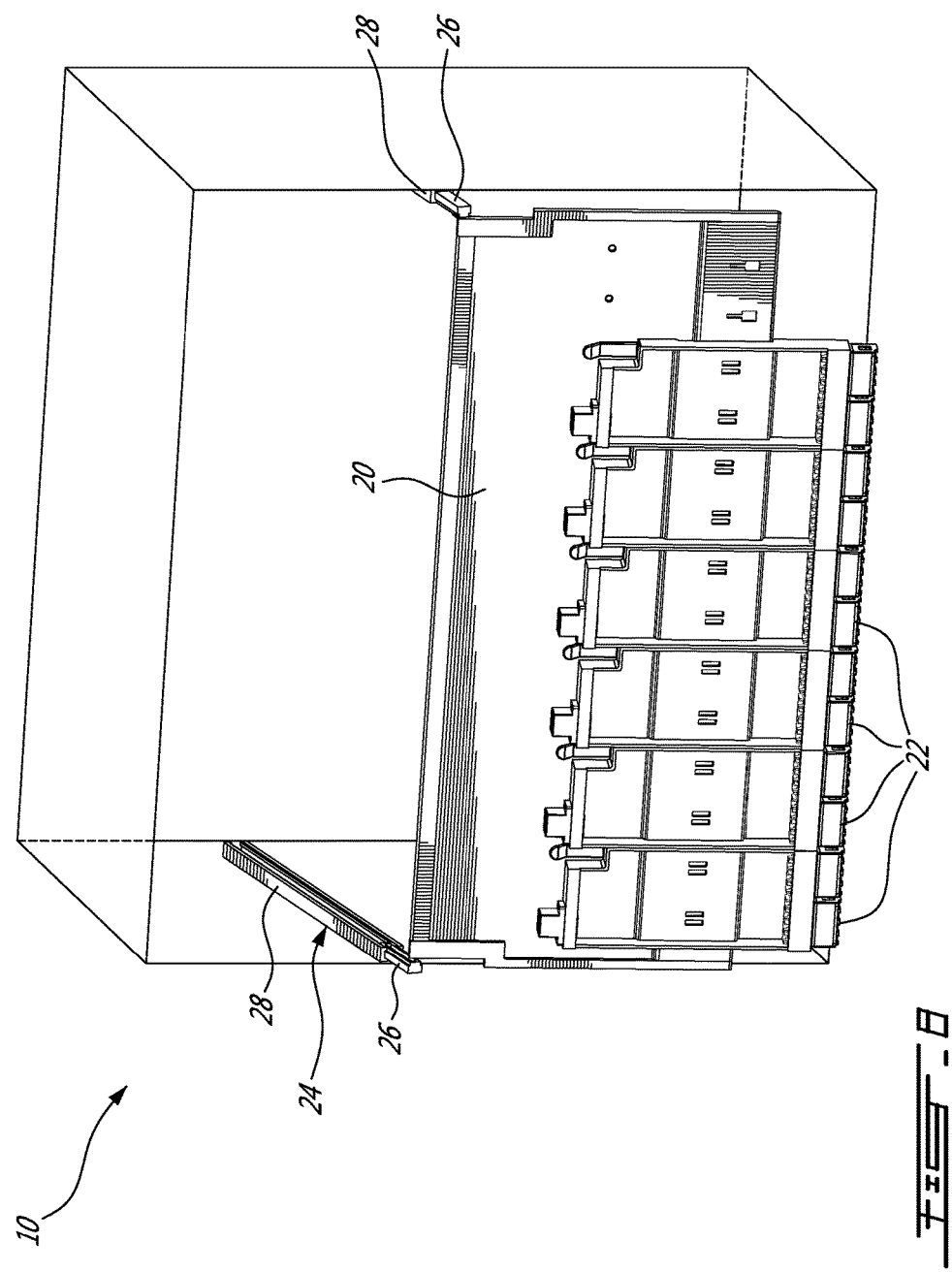

SLIDE AND TILT TRAY, SLIDE AND TRAY USING SAME

CROSS REFERENCE TO RELATED APPLICATIONS

This Application claims priority under 35 USC § 119(e) of U.S. provisional application Ser. No. 62/568,456 filed on Oct. 5, 2017 which is incorporated herein in its entirely by reference.

FIELD OF THE INVENTION

The present invention relates to a tilting and sliding tray for a fiber optic cassette cabinet.

BACKGROUND OF THE INVENTION

The prior art discloses cabinets containing fiber optic cassettes arranged on racked sliding tray systems. One drawback of these tray systems is that when a tray is slid out of the cabinet, it is difficult to access the rear portion of the cassettes.

SUMMARY OF THE INVENTION

In order to address the above and other drawbacks, there is provided a fiber optic cassette cabinet assembly. The assembly comprises two opposed side walls, a top wall and a bottom wall, a forward edge of each of the walls forming a cabinet opening, a tray comprising a pair of side edges arranged substantially in parallel, an upper surface for receiving a plurality of fiber optic cassettes, a rear edge and a pair of hinge pins each positioned opposite one another on respective ones of the side edges towards the rear edge, the pins together defining a hinge axis arranged at right angles to the side edges, and a pair of slider assemblies positioned opposite one another on an inner surface of respective ones of the opposed side walls, each of the slider assemblies comprising a channel arranged horizontally on the respective one of the sidewall and defining an elongate opening, the slider assembly further comprising an elongate extension member held slideably within the channel and comprising an elongate pin receiving slot aligned with the opening, the extension member slideable within the channel between a rearward position, wherein the extension member is positioned towards a rearward end of the channel and a forward position wherein the extension member is positioned adjacent a front end of the channel. Each of the pins is slideably held within respect ones of the slots, wherein the tray is dimensioned such that when the extension member is slid into the rearward position the side edges are slideably received within respective ones of the opening and wherein when the extension member is slid into the forward position, each of the side edges is freed from the respective opening and such that the tray is pivotable about the hinge axis.

There is also disclosed a slide for mounting as one of an opposed pair on a respective sidewall of a fiber optic cassette cabinet, the opposed pair slideably supporting a tray moveable between a rearward position and a forward position and comprising a pair of side edges arranged substantially in parallel, an upper surface for receiving a plurality of fiber optic cassettes, a rear edge and a pair of hinge pins each positioned opposite one another on respective ones of the side edges towards the rear edge, the pins together defining a hinge axis arranged at right angles to the side edges. The slide comprises a channel for securing horizontally on a respective one of the sidewall and defining an elongate opening, and an elongate extension member held slideably within the channel and comprising an elongate tray pin receiving slot aligned with the opening, the extension member positionable between a rearward end of the channel and a front end of the channel. Each of the pins is slideably held within respect ones of the slots, wherein the elongate opening is dimensioned such that when the tray is slid into the rearward position and the extension member is positioned towards the rearward end, the side edges are slideably received within the opening and wherein when the tray is slid into the forward position and the extension member is positioned at the front end, the side edge is freed from the opening and such that the tray is pivotable about the hinge axis.

BRIEF DESCRIPTION OF THE DRAWINGS

FIG. 1 provides a right front perspective view of a cabinet containing a tilting and sliding tray for fiber optic cassettes, in accordance with an illustrative embodiment of the present invention;

FIG. 2 provides a top view of a tilting and sliding tray for a fiber optic cassette cabinet, in accordance with an illustrative embodiment of the present invention;

FIG. 3 is a right front perspective view of an elongate extension member sliding within a rail for a fiber optic cassette cabinet, in accordance with an illustrative embodiment of the present invention;

FIG. 4 is a right front perspective view of an elongate extension member for a fiber optic cassette cabinet, in accordance with an illustrative embodiment of the present invention;

FIG. 5 is a right front perspective view of a rail for a fiber optic cassette cabinet, in accordance with an illustrative embodiment of the present invention;

FIG. 6 is a more detailed right front perspective view of the elongate extension member sliding within the rail of FIG. 3, in accordance with an illustrative embodiment of the present invention;

FIG. 7 is a right front perspective view of a fiber optic cassette cabinet with a tray in a fully retracted position, in accordance with an illustrative embodiment of the present invention; and FIG. 8 is a right front perspective view of a fiber optic cassette cabinet with a tray in a fully extended and tilted position, in accordance with an illustrative embodiment of the present invention.

DETAILED DESCRIPTION OF THE ILLUSTRATIVE EMBODIMENTS

Referring now to FIG. 1, a cabinet containing a tilting and sliding tray for fiber optic cassettes, generally referred to using the reference numeral 10, will now be described. The cabinet 10 comprises two opposed side walls 12, 14, a top wall 16 and a bottom wall 18. A forward edge of the four walls 12, 14, 16, 18 form a cabinet opening for receiving a flat tray 20 for attaching fiber optic cassettes 22. Each tray 20 is held in place by a pair of slides 24, or slider assemblies, each comprising an elongate extension member 26 inserted into channel 28, one of the slider assemblies 24 mounted to respective ones of opposite side walls 12, 14 of the cabinet 10 and facing each other, such that the tray 20 is slidable within respective extension members 24 and both the tray 20 and the extension members 24 are slidable within the channels 28, as will be described in further detail below.

Referring now to FIG. 2 in addition to FIG. 1, the tray 20 comprises an upper surface 30 that receives the fiber optic cassettes 22. The upper surface 30 comprises apertures 32 each providing access to a respective keyhole slot 34 shaped to receive the fiber optic cassettes 22. As a person skilled in the art will now understand, the fiber optic cassettes 22 may be attached to the upper surface 30 of the tray 20 by inserting and sliding protrusions (not shown) located on the bottom of the cassette 22 via respective ones of the apertures 32 into the keyhole slots 34. To remove the cassette 22 from the tray 20, a flexible tab 36 is lifted, thus releasing a boss (not shown) on the underside of the tab 36 from its respective aperture 32, allowing the cassette 22 to be slid forward, thereby releasing it from the keyhole slots 34 and the tray 20.

Still referring to FIG. 2 in addition to FIG. 1, the tray 20 comprises outer edges 38, 40 each comprising a respective cut-out 42, 44 configured for abutting the extension members 24 and sliding within the channels 28. The tray 20 further comprises a pair of pins 46, 48 positioned along a respective one of the outer edges 38, 40 of the tray 20 and along a hinge axis A substantially aligned with a rear edge 50 of the tray 20. Each of the pins 46, 48 are configured for insertion into a slot 52 in a respective one of the extension members 24, and each pin 46, 48 is freely movable in the slot 52 in its respective extension member 24, as will be discussed in further detail below.

Referring now to FIG. 3 in addition to FIG. 1, each extension member 24 is slideable within its respective channel 28 between a forward position and a rearward position. As will be discussed in further detail below, abutments (not shown) on the extension member 24 and complementary stops (not shown) on the channel 28 limit the travel of the extension member 24 between the front end and the rearward end of the channel 28.

Referring now to FIG. 4 in addition to FIG. 1 and FIG. 2, the extension members 24 each comprise an upper surface 54, lower surface (not shown) and cut-outs 56 such that each extension members 24 may slide along its respective channel 28. The extension members 24 each further comprise an abutment 58 which limits a forward travel within the channels 28, as will be discussed in further detail below. As discussed above, each of the extension members 24 further comprises a tray pin-receiving slot 52 for receiving the pins 46, 48. When the pins 46, 48 are inserted into a respective tray-pin receiving slot 56 of the extension members 24, the tray 20 may slide between an extended position in the slot 52 (as will be shown in FIG. 8) and a retracted position in the slot 52 (as will be shown in FIG. 7). Further, when in its extended position, the tray 20 is rotatable about the hinge axis A between a horizontal position (as shown in FIG. 1) and a lowered vertical position (as will be shown in FIG. 8).

Referring now to FIG. 5 in addition to FIGS. 1 through 4, the channels 28 are illustratively comprised of a rectangular open seam tube 60 comprising a substantially C-shaped cross section defining an elongate opening bounded by a pair of opposed upper 62 and lower 64 opening edges with upper 66 and lower 68 elongate outwardly facing inserts, wherein each of the upper 66 and lower 68 elongate outwardly facing inserts are terminated at each end by stops 70. Referring additionally to FIG. 6, each extension member 24 is inserted into a respective channel 28 such that the upper surface 54 and lower surface (not shown) are received within the channel 28, the cut-outs 54 are pressed against upper 62 and lower 64 opening edges, and the abutments 58 rest within the upper 66 and lower 68 elongate outwardly facing inserts. In this manner each extension member 24 is snugly and slideably held within a respective one of the channels 28. At each end of the channels 28, each abutment 58 comes into contact with one of a plurality of stops 70, thus preventing each extension member 24 from sliding out of a respective channel 28. Tray 20 is also slideable within channels 28, as the outer edges 38, 40 are positioned between the opposed upper 62 and lower 64 edges of a respective opening.

Referring now to FIG. 7 in addition to FIG. 2-6, the tray 20 is shown in a fully retracted position within the cabinet 10. In this position, the extension members 24 are fully retracted in each of the channels 28, the pins 46, 48 are fully retracted in each tray pin-receiving slots 52, and the outer edges 38, 40 of the tray 20 are positioned between the opposed upper 62 and lower 64 edges of the opening to each channel 28. In this position, tray 20 is not able to be rotated and the cassettes 22 are stored within the cabinet 10.

Referring now to FIG. 8 in addition to FIG. 2-6, the tray 20 is shown in a lowered vertical position outside of the cabinet 10. In this position, the extension members 24 are fully extended in their respective channels 28, the pins 46, 48 are fully extended in each of their respective tray pin-receiving slots 52 outside the opening of cabinet 10 and such that the tray 20 is free to be rotated about the hinge axis A. In this position, both the front and rear of each of the cassettes 22 are easily accessible by a user.

While FIGS. 1, 7 and 8 show a cabinet 10 with only one tray 20 installed, a person skilled in the art would understand that typical fiber optic cassette cabinets comprise a plurality of sliding trays stacked one above the other. Thus, in an embodiment, the present invention discloses a fiber optic cassette cabinet comprising a plurality of tilting and sliding trays.

Although the present invention has been described hereinabove by way of specific embodiments thereof, it can be modified, without departing from the spirit and nature of the subject invention as defined in the appended claims.

The invention claimed is:

1. A fiber optic cassette cabinet assembly comprising:
   two opposed side walls, a top wall and a bottom wall, a forward edge of each of said walls forming a cabinet opening;
   a tray comprising a pair of side edges arranged substantially in parallel, an upper surface for receiving a plurality of fiber optic cassettes, a rear edge and a pair of hinge pins each positioned opposite one another on respective ones of said side edges towards said rear edge, said pins together defining a hinge axis arranged at right angles to said side edges; and
   a pair of slider assemblies positioned opposite one another on an inner surface of respective ones of said opposed side walls, each of said slider assemblies comprising a channel arranged horizontally on said respective one of said sidewall and defining an elongate opening, said slider assembly further comprising an elongate extension member held slideably within said channel and comprising an elongate pin receiving slot aligned with said opening, said extension member slideable within said channel between a rearward position, wherein said extension member is positioned towards a rearward end of said channel and a forward position wherein said extension member is positioned adjacent a front end of said channel;
   wherein each of said pins is slideably held within respect ones of said slots, wherein said tray is dimensioned such that when said extension member is slid into said rearward position said side edges are slideably received within respective ones of said opening and wherein when said extension member is slid into said forward position, each of said side edges is freed from said respective opening and such that said tray is pivotable about said hinge axis.

2. The fiber optic cassette cabinet assembly of claim 1, wherein when in said forward position, a forward end of said extension member and said slot extends from said front end.

3. The fiber optic cassette cabinet assembly of claim 1, wherein said channel comprises a stop and said extension member comprises an abutment for engaging said stop, thereby limiting travel of said extension member in a forward direction.

4. The fiber optic cassette cabinet assembly of claim 1, wherein said channel comprises a rectangular open seam tube and said extension member is dimensioned to fit snugly within said tube.

5. The fiber optic cassette cabinet assembly of claim 1, wherein said rectangular open seam tube is secure to said inner surface using a plurality of fasteners.

6. The fiber optic cassette cabinet assembly of claim 1, wherein said extension member comprises a main body and a raised collar surrounding said slot and further wherein said main body is dimensioned to fit snugly within said tube and said raised collar is dimensioned to fit snugly within said opening.

7. The fiber optic cassette cabinet assembly of claim 1, wherein said cabinet is dimensioned to receive a plurality of said trays and respective slider assemblies.

8. The fiber optic cassette cabinet assembly of claim 1, wherein said cabinet is dimensioned to receive a plurality of said trays and respective slider assemblies.

9. A slide for mounting as one of an opposed pair on a respective sidewall of a fiber optic cassette cabinet, the opposed pair slideably supporting a tray moveable between a rearward position and a forward position and comprising a pair of side edges arranged substantially in parallel, an upper surface for receiving a plurality of fiber optic cassettes, a rear edge and a pair of hinge pins each positioned opposite one another on respective ones of the side edges towards the rear edge, the pins together defining a hinge axis arranged at right angles to the side edges, the slide comprising:

a channel for securing horizontally on a respective one of said sidewall and defining an elongate opening; and an elongate extension member held slideably within said channel and comprising an elongate tray pin receiving slot aligned with said opening, said extension member positionable between a rearward end of said channel and a front end of said channel;

wherein each of the pins is slideably held within respect ones of said slots, wherein said elongate opening is dimensioned such that when the tray is slid into said rearward position and said extension member is positioned towards said rearward end, the side edges are slideably received within said opening and wherein when the tray is slid into said forward position and said extension member is positioned at said front end, the side edge is freed from said opening and such that the tray is pivotable about said hinge axis.

10. The fiber optic cassette cabinet assembly of claim 9, wherein when at said front end, a forward end of said extension member and said slot extends from said front end.

11. The fiber optic cassette cabinet assembly of claim 9, wherein said channel comprises a stop and said extension member comprises an abutment for engaging said stop, thereby limiting travel of said extension member in a forward direction.

12. The fiber optic cassette cabinet assembly of claim 9, wherein said channel comprises a rectangular open seam tube and said extension member is dimensioned to fit snugly within said tube.

13. The fiber optic cassette cabinet assembly of claim 9, wherein said rectangular open seam tube is securable to said sidewall using a plurality of fasteners.

14. The fiber optic cassette cabinet assembly of claim 9, wherein said extension member comprises a main body and a raised collar surrounding said slot and further wherein said main body is dimensioned to fit snugly within said tube and said raised collar is dimensioned to fit snugly within said opening.

\* \* \* \* \*